June 6, 1933.  N. MINORSKY  1,912,489
AUTOMATIC STEERING DEVICE
Filed Sept. 4, 1929  5 Sheets-Sheet 1

INVENTOR
Nicolai Minorsky
BY *Kelly Paul*
ATTORNEYS.

June 6, 1933.   N. MINORSKY   1,912,489
AUTOMATIC STEERING DEVICE
Filed Sept. 4, 1929   5 Sheets-Sheet 4

INVENTOR
Nicolai Minorsky
BY
ATTORNEYS

Patented June 6, 1933

1,912,489

UNITED STATES PATENT OFFICE

NICOLAI MINORSKY, OF MERION, PENNSYLVANIA, ASSIGNOR TO PIONEER INSTRUMENT COMPANY, INCORPORATED, OF BROOKLYN, NEW YORK, A CORPORATION OF NEW YORK

AUTOMATIC STEERING DEVICE

Application filed September 4, 1929. Serial No. 390,346.

This invention relates to an automatic device adapted to control the rudder of ships, aeroplanes, airships and other sea and air craft that have to be kept heading along a definite line during navigation.

The main object of my invention is to provide a suitable controlling device afforded by a special magnetic instrument and to influence by means of said control the rudder-actuating gear in such a way that the rudder will be shifted by an amount very small but sufficient to neutralize the action of the disturbing torque almost the instant said torque is incipiated.

My invention comprises three principal parts, to wit:

(a) The steering instrument which emits an electric action proportional to the amount by which the ship is deflected from its predetermined heading line;

(b) The amplifying system which amplifies said electric action so as to render it adequate to actuate the servo-motors of the helm;

(c) The helm or rudder servo-motor control system.

Besides the foregoing division of the steadying system into three parts, other important and characteristic features will become hereinafter apparent.

In order to make my invention more clearly understood, I will refer to drawings appended hereto and wherein:

Figure 1 is a perspective view of the magnetic device that controls the automatic steering system;

Figure 2 shows a diagram of the connections relating to Figure 1;

Figure 2$^a$, a diagram of a modification of Figure 2;

Figure 8 is a complete schematic circuit diagram embodying substantially all of the elements of the novel automatic steering system and showing their relation to each other.

Figures 1, 2, 2A:
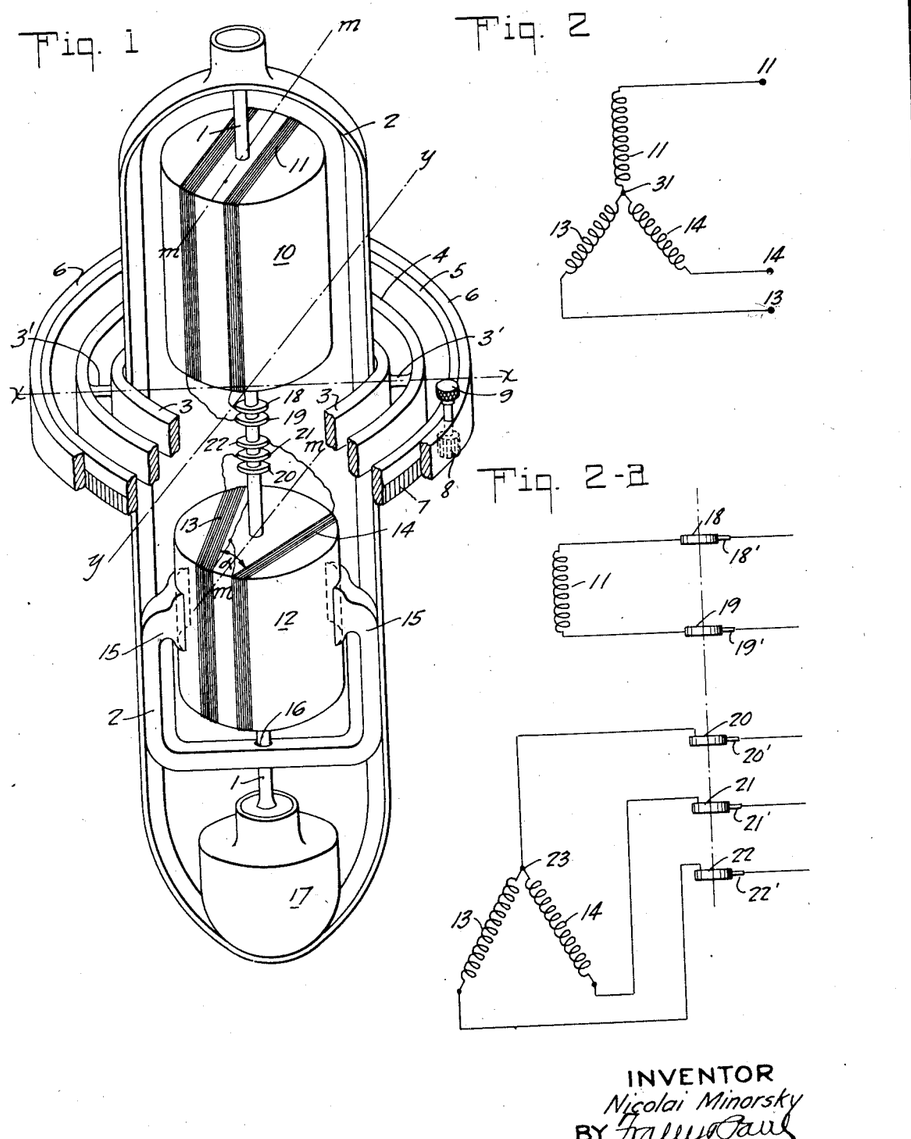

Referring now to the drawings, it will be apparent that the apparatus comprises (Figure 1) a shaft 1 made of non-magnetic material and kept in vertical position by means of a cardan suspension, also made of non-magnetic material (bronze, brass, etc.). Said suspension comprises a frame 2 carrying the bearings for shaft 1 and the other elements of the instrument. On said frame is secured a ring 3, and concentrically to this ring, and somewhat spaced from one another, two other rings 4 and 5 are arranged. Ring 4 is connected with ring 3 by means of trunnions 3' and is adapted to move about the axis $x$—$x$; ring 5 is connected with ring 4, also by means of trunnions (not shown) located along axis $y$—$y$ and about which the ring 5 is pivotable. Said ring 5 carries, on its outer part, a set of teeth 7 wherewith meshes a pinion 8 secured to ring 6, as shown by Figure 1. Therefore, by rotating the axis of pinion 8 by means of a control 9 the frame 2 can be revolved in azimuth respective to the ship.

A drum 10 made of insulating material is keyed on the upper part of the shaft 1. Said drum carries a coil 11 (supposed on the figure to be constituted by two half-coils, for the sake of symmetry) comprising a very great number of turns of fine wire.

Keyed on shaft 1, but below the drum 10, is another drum 12 made of magnetic material. Said drum 12 carries two coils 13, 14, set at a certain angle $\alpha$ relative to one another. The two drums 10 and 12 are keyed on the shaft 1 in the manner illustrated by Figure 1; that is to say, the diametrical plane $m$—$m$ of the turns of the coil 11 bisects the angle $\alpha$ formed by coils 13 and 14.

The drum 12 is located within the magnetic field of a permanent magnet 15 (which indeed, may be replaced by an electro-magnet) secured to frame 2, as shown by Figure 1; the shaft 1 passes through an aperture 16 provided in magnet 15 and is connected with the shaft of an electric motor 17 which rotates the shaft 1 and drums 10 and 12 as a set or system.

The connection for coils 11, 13 and 14 is indicated in Figures 2 and 2ᵃ.

Figure 2 denotes the coils by the same reference numerals as Figure 1. As regards the relative phase of the vectors of the electro-motive forces induced into windings 11, 13, 14, Figure 2 gives a correct condensed representation, and, in this respect, the operation of the apparatus will be described with reference to the diagram of Figure 3, while keeping in view the scheme shown by Figure 2.

With the practical apparatus, however, the order of magnitude, on the one hand, of the electro-motive forces $E_{11}$ (that is to say, of those induced into coil 11), and, on the other hand, of the forces $E_{13}$, $E_{14}$, is different. $E_{11}$ in particular is an electro-motive force induced by the horizontal component of the terrestrial field, and is, therefore, an electro-motive force rather weak as compared to $E_{13}$ or $E_{14}$. Consequently, the said electro-motive force $E_{11}$ has to be amplified previous to being put into conjunction with $E_{13}$ and $E_{14}$. For this purpose, the actual connection is slightly different, being indicated on Figure 2ᵃ as well as on Figure 1.

The coil 11 is connected with two rings 18, 19 secured on shaft 1. The coils 13 and 14 are connected together at point 23 which is connected with ring 20; the two other ends of the coils 13 and 14 are connected with rings 21 and 22. The corresponding brushes 18′, 19′, 20′ permit of employing the electro-motive forces brought into play in coils 11, 13 and 14 in the outer circuit for the steadying control, as will be more precisely explained hereinafter. The wires that connect these brushes with the outer circuits of the apparatus illustrated by Figure 1 are housed within the suspension rings 3, 4 and 5 and pass from one ring to the other through the inside of the trunnions of axes or spindles $x$—$x$, $y$—$y$, so that any stress likely to interfere with the freedom of the apparatus in space is thereby eliminated.

The operation of the instrument is as follows:

The flux of the horizontal component of the terrestrial magnetic field acts on the coil 11 (Figure 1); while the field of magnet 15 located in azimuth with the ship through the above described suspension system acts on the coils 13 and 14.

Figure 3:
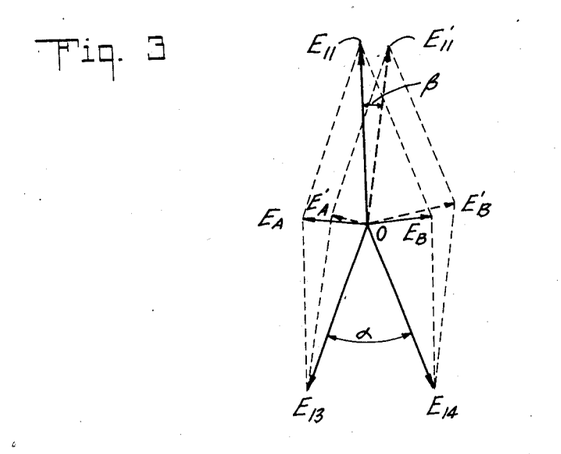
Figure 3 is a diagram of the electromotive force vectors brought into play during operation of the device illustrated by Figure 1.

Considering a symmetrical position as indicated on Figure 1, when the axis of magnet 15 is parallel to the direction of the magnetic meridian, the corresponding operation will be exemplified by referring to the vector diagram of the electro-motive forces indicated in full lines on Figure 3.

According to the usual conventions obtaining in the theory of alternating current, $E_{11}$ represents the maximum value of the sinusoidal electro-motive force induced in the coils 11 consequent upon the rotation thereof within the flux of the horizontal component of the terrestrial magnetic field; while $E_{13}$, $E_{14}$ represent the corresponding values of the electro-motive forces induced in the coils 13 and 14 consequent upon the rotation thereof within the field of the magnet 15.

The corresponding values of the electro-motive forces induced between the outer terminals of coils 11 and 13, on the one hand, and those of 11 and 14 (Figure 2), on the other hand, are represented in the diagram of Figure 3 by the vectors $E_A$ and $E_B$ as diagonals of the parallelograms built on vectors $E_{11}$ and $E_{13}$, on the one hand, and $E_{11}$, $E_{14}$, on the other hand. Supposing now the ship departs from her symmetrical position (where the axis of magnet 15 is parallel to the direction of the magnetic meridian and makes a yaw angle $\beta$, the relative phase of $E_{11}$, on the one hand, and of $E_{13}$, $E_{14}$, on the other hand, will vary by the same angle $\beta$, since one of the fields (here especially the terrestrial field) remains stationary in space while the other one (the field of magnet 15) is turned in azimuth by angle $\beta$. Adopting as a reference system the phase of electro-motive forces $E_{13}$, $E_{14}$, then the phase of the electro-motive force $E_{11}$ induced by the terrestrial field will be altered by an angle equal to the angle of the yaw, as indicated as $E'_{11}$ on Figure 3. The electro-motive force parallelograms $OE'_{11}$—$E'_A$—$E_{13}$ and $OE'_{11}$—$E'_B$—$E_{14}$ are no longer equal as in the symmetrical position; especially, electro-motive force $OE'_B$ has become greater than its initial value $OE_B$; while the other one $OE'_A$ has become smaller than the initial value $OE_A$.

In practice, advantage will attach to taking angle $\beta$ rather small; then, in the symmetrical position, vector $E_{11}$ will be almost in opposition to the two other vectors $E_{13}$, $E_{14}$, and, in such conditions, for small yaw angle $\beta$ the variation of vectors $E_A$, $E_B$ will be approximately proportional to the angle $\beta$ which results from simple trigonometrical considerations.

It is obvious that for a yaw angle in the opposite direction the variation of vectors $E_A$, $E_B$ also takes place in the opposite direction so that the apparatus actually has bilateral action about zero.

Said variation of vectors $E_A$, $E_B$ is availed of in order to produce the controlling action for the purpose of steadying the ship along her heading line. For this purpose there are utilized the well known properties of electron discharge tubes working as potential amplifiers.

It is important to mention that, according to the principle used, the steering apparatus is essentially an alternating potential one. This offers considerable advantage, first of all because, instead of bearing on the commutator as with hitherto existing induction compasses, the brushes bear on the rings, whereby their operation is materially improved; and, next, because the use of alternating potential lends itself better than direct current to amplification by means of electron discharge tubes, amplification with direct current being very awkward to achieve in a satisfactory manner.

Figure 4:
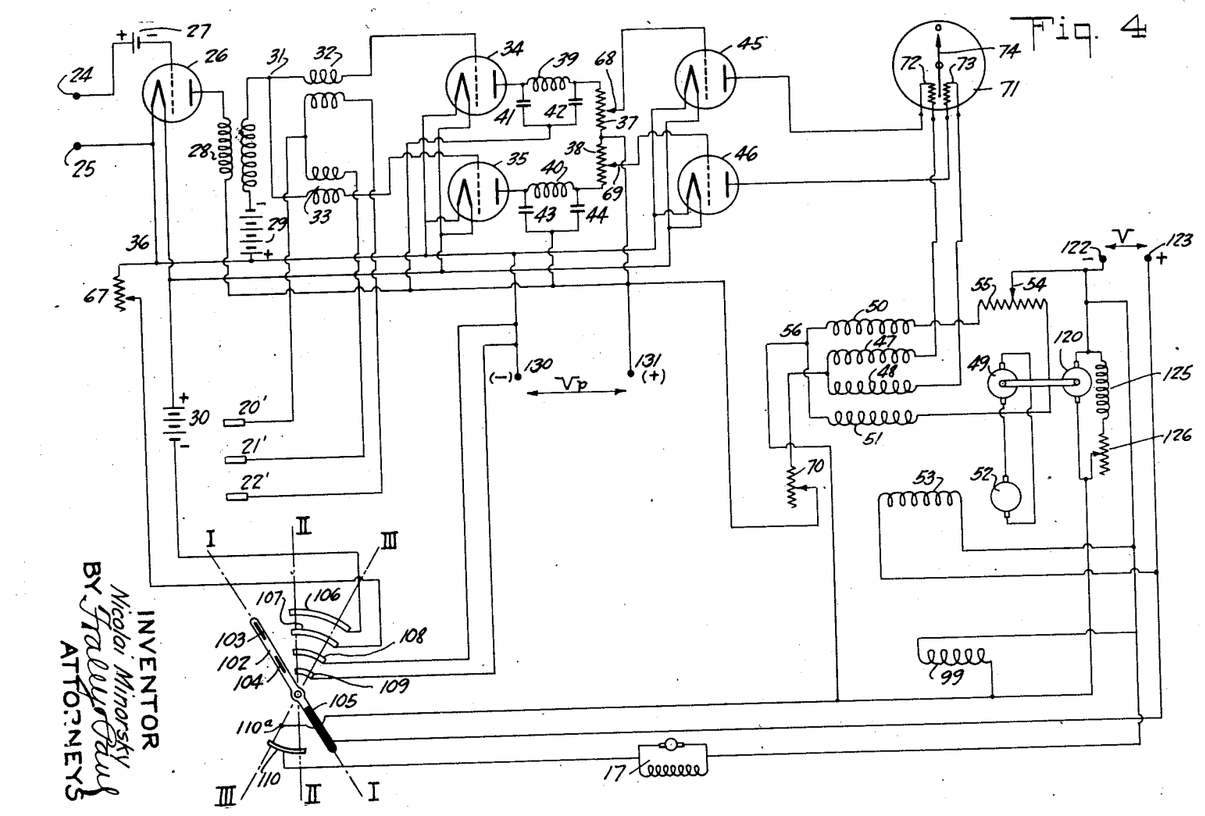
Figure 4 is a complete diagram of the automatic steering device.

Operation of the amplifier system is indicated on Figure 4. The alternating voltage induced into coil 11 (Figures 1 and $2^a$) is applied to terminals 24, 25. Terminal 25 is connected with the filament cathode of electron discharge tubes 26, while terminal 24 is connected with the grid of that same tube; said two terminals 24 and 25 being connected with brushes 18' and 19' shown on Figure $2^a$. A small grid battery 27 fixes the operative point at about the middle of the characteristic of tube 26. The primary of a transformer 28 is inserted into the output circuit of tube 26; and the primary impedance of said transformer is selected nearly equal to the resistance of the filament-plate spacing of the tube whereby suitable amplification is rendered possible.

The secondary of the transformer 26 is connected, on the one side, through a grid battery 29, with the negative pole 36 of the tube heating battery 30 and, on the other side, with a common point 31 which, from the electrical point of view, is equivalent to point 31 of the diagram shown by Figure 2. The electro-motive forces $E_{13}$, $E_{14}$ (Figure 3) induced into coils 13 and 14 of Figure 1, are tapped into the inner circuit by means of brushes 20', 21' and 22' (Figures $2^a$ and 4). The two primaries of transformers 32, 33 are connected with one another and also with brush 20', while the two other ends of said primaries are connected with brushes 21' and 22'. The secondaries of transformers 32 and 33 are connected, on the one hand, with one another at point 31 and, on the other hand, with the grids of tubes 34 and 35.

As a result, between the common point 36 of the filaments of tubes 34 and 35 and the grids thereof, there exist alternating potential differences represented on the vector diagram of Figure 3 by vectors $E_A$ and $E_B$. The maximum values of the alternating potentials induced into the secondaries of transformer 28 and of the two transformers 32, 33 remain the same, while the relative phase of the potential induced in the secondary of 28 varies with respect to the potentials in those of transformers 32 and 33 whereby variations of $E_A$ and of $E_B$ are caused as indicated by Figure 3.

The grid battery 29 common to both tubes 34, 35 is employed to adjust the operative point so that the plate currents are nil in the absence of the electro-motive forces in the circuits between the filaments and the grids of tubes 34, 35. As a result, when said circuits receive sinusoidal electro-motive forces, the plate circuits will be traversed by currents the mean value of which will be, in general, a function of the mean value of a rectified half-wave applied to the corresponding grid. In order to be able to eliminate the alternating current component of the plate currents, it is preferable to connect, between the plates of tubes 34, 35 and their corresponding coupling resistances 37, 38, filter circuits which, by way of example, are indicated as comprising self-inductance coils 39, 40 and condensers 41, 42, 43, 44. Owing to filters being employed, the currents that flow through resistances 37 and 38 are direct currents having values which are thus in relation to the mean value of the alternating tension half-wave applied to the corresponding grid.

The tubes 45 and 46 are power tubes; their connection with tubes 34 and 35 of the preceding stage is effected through resistances 37, 38 operating under direct current. So, the plate currents of tubes 45 and 46 vary in directions opposite to one another as a function of the mean value of the alternating potential half-waves applied between the filaments and the grids of the tubes 34 and 35.

In this manner, the plate currents of tubes 45 and 46 represent the amplified control action which I utilize to operate the servomotor device which actuates the ship's rudder.

For this purpose, said plate currents flow through two windings 72 and 73 of an indicator apparatus 71 and go to two field excitation windings 47, 48 wound in directions opposite to one another in an independent direct current-generating dynamo having an armature 49 driven by motor 120. Said dynamo also carries two field excitation windings 50, 51, the duty of which will be made hereinafter apparent. If the plate currents of tubes 45 and 46 are equal—which corresponds to equality of vectors $E_A$ and $E_B$ in Figure 3 and to the ship shaping her course exactly in accordance with her heading line—the magnetic circuit of the dynamo remains unenergized and the voltage at the terminals of its armature 49 is nil also.

If, from this symmetrical position, the ship makes a yaw by an angle $\beta$ as was explained in reference to the diagram of Figure 3, the unbalancing of vectors $E_A$ and $E_B$ is accompanied by a corresponding unbalancing of the plate currents, and, consequently, by an appearance of the induced electro-motive force in the armature 49 of the dynamo offering a certain polarity. If the angle $\beta$ of the yaw changes sign, the polarity of the voltage from armature 49 will be reversed, too. Lastly, I so arrange as to have the operation limits on the rectilinear parts of the different characteristics, and I am thus enabled to obtain a proportionateness between the angle $\beta$ of the yaw and the electro-motive force induced in the armature 49.

The armature 49 of the dynamo is connected with the armature 52 of an electric motor having the field excitation winding 53. This motor is excited in a constant manner. The motor 52 operates either directly on the rudder or on the distributing device, such as, for instance, the valve of an engine adapted to operate the ship's rudder, as will be set forth in reference to Figure 4. Persons skilled in the art are aware that, under such conditions, there is a relation between the voltage at the terminals of the dynamo 49 and the speed of motor 52.

In order to obtain an action preferably damped, so as to neutralize a yaw, as the rudder's angle continues to increase, I utilize the following auxiliary device:

A mobile contact 54, carried along with the rudder's movement, moves along a resistance 55 having its terminals connected with coils 50 and 51; the other ends of said coils are connected together at point 56 directly connected with one pole of the direct current supply mains, while the other pole of said supply mains is connected with the mobile contact 54. When the rudder is midway (straight ahead), the mobile contact 54 is in the middle of the resistance 55 and the currents in coils 50 and 51 are equal; consequently, their magnetizing action is nil. If, due to the rudder being shifted, contact 54 moves, for instance, toward the left along resistance 55, the current increases in coil 50 and decreases in coil 51, thereby causing the appearance of a resulting excitation whose ampere-turns value is equal to the difference of the ampere-turns of coils 50 and 51. The connections between the terminals of resistance 55 and coils 50 and 51 are so established that said resulting ampere-turns will lower the initial excitation of the dynamo 49. As a result, the rudder's angle will increase more and more slowly as the rudder moves away from its mean position. So the rudder will move most forcibly at or near the zero point, thereby neutralizing a yaw as the latter is beginning.

Should, however, due to any cause, the yaw continue to develop, then I prefer to slow down the speed of the rudder and wait until the latter's action makes itself felt on the angular inertia of the ship, rather than put the helm up too hard at once, which would uselessly reduce the ship's speed and bring about favorable circumstances for fostering a yaw in the opposite direction.

Another important feature of this invention lies in the utilization of means responding to the instantaneous angular speed of the incipient yaw. Persons skilled in the art are aware that an experienced helmsman will allow himself to be guided by close watching of said angular speed in order to exert helm "stiffening" and "easing" actions at the proper time. In order to achieve this important handling, I utilize the following device which, for the sake of greater clearness, I have separately indicated on Figure 5, although, as a matter of fact, it belongs to the general diagram of Figure 4.

Figure 5:
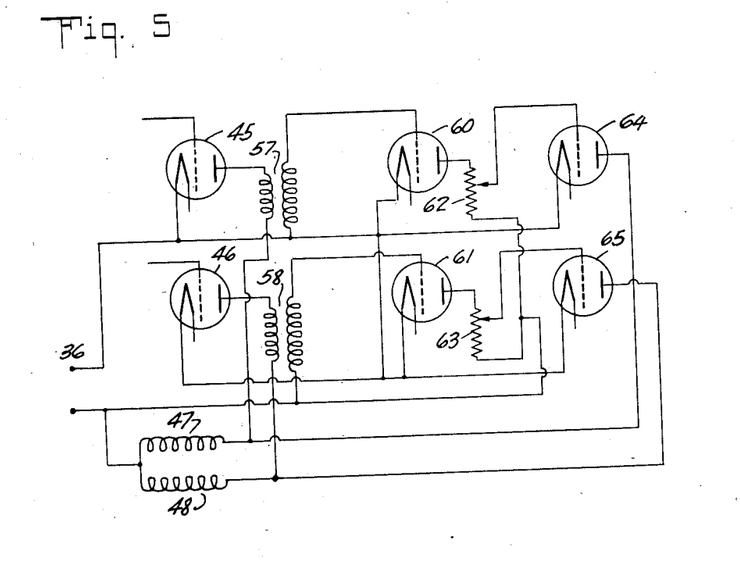
Figure 5 is a detail of Figure 4, showing a device adapted to permit the helm "stiffening" and "easing" actions (in helmsman's vernacular)

In Figure 5, the tubes 45 and 46 are the same as the lamps 45 and 46 in Figure 4; similarly, in said Figure 5, 47 and 48 denote the opposite windings of the dynamo.

In order to obtain dynamic control from angular speed, I intercalate, in series with the plate circuits of tubes 45 and 46, the primaries of two transformers 57 and 58 having primaries constituted of a very great number of turns of fine wire. Two ends of the secondaries are connected with a common point 36 and thence with the negative pole of the filaments of all the tubes connected in parallel, as indicated on Figure 4; the two other free ends of the secondaries are connected with the grids of the tubes 60 and 61, which, by means of ordinary connection through resistances 62 and 63, are connected with the grids of the power tubes 64 and 65, the plates of which are connected with the excitation windings 47 and 48 of dynamo 49.

The operation of said device is as follows:

Supposing that the ship is traveling exactly along her heading line, then the plate currents of tubes 45 and 46 remain equal and constant; as a result, the electro-motive forces induced in the secondaries of transformers 57 and 58 are nil and, in virtue of the symmetry of the connections, the plate currents of tubes 64 and 65 are also equal. Within winding 47, the plate currents of lamps 45 and 64 are superimposed and their magnetic action is neutralized by the opposite ampere-turns of the plate currents of 46 and 65 being superimposed within winding 48.

If, on the contrary, a yaw is being developed, the plate currents of the tubes 45 and 46 will vary proportionally to the angle of the yaw at any moment. In virtue of Lenz's law, there arise in the secondaries of transformers 57 and 58 electro-motive forces having instantaneous values proportional to the instantaneous angular speed of the yaw. If, for instance, the plate current of the tube 45 increases and the plate current of the tube 46 decreases, the connections between the secondaries of transformers 57 and 58 and the grids of the tubes 60 and 61 (in the case of the diagram shown by Figure 5) should be made in such a way that the potential of the grid of the tube 60 will be lowered and the grid potential of the tube 61 will be raised under the influence of the electro-motive forces induced in the secondaries. Due to the resistance connection with the power tubes 64 and 65, the grid potential of the tube 64 is increased, while the grid potential of the tube 65 is decreased. As a result the delivery from the tube 64 is increased and thus superadded to the corresponding action of the tube 45; the same variation, but in the contrary direction, takes place owing to the tube 65. So, in the case considered, the tubes 64, 65 exert a typical "stiffening" action through their action responding to the angular speed of the yaw. Reasoning analogous to the foregoing will permit of realizing how the "helm easing" action is automatically obtained by means of the same device. The only difference will reside in the fact that, instead of being superadded to, the current variations of the tubes 45 and 64 for winding 47 will be deducted from one another. It is obvious that the same remark stands true as regards the current variations of the tubes 46 and 65 for winding 48.

I might intercalate, in series with the plate circuits of the tubes 64 and 65, transformers analogous to transformers 57 and 58 and add four tubes analogous to the tubes 60, 61, 64 and 65. I would thus obtain a control responsive to the angular acceleration of the yaw, which would give even more sensitive helm "stiffening" and "easing" actions. Broadly, with the device illustrated by Figure 5 responsive to the first derivative (respecting time) of incipient yaw, the automatic control already is practically perfect.

The above described automatic steering method readily lends itself to various adjustments either in view of ensuring satisfactory steering of ships offering different characteristics or in view of obtaining, with one and the same ship, steering appropriate to the sea, weather, etc., conditions.

The manners in which such adjustments may be effected with the device which is the subject-matter of this invention are very numerous, but I will indicate only a few of them in order to fix ideas.

As concerns methods of adjustment I will indicate the three principal ones, to wit:
(1) Intensity of the steering control;
(2) Intensity of the dynamic control through angular speed;
(3) Intensity of the control applied to the rudder.

The first method of adjustment serves to modify the factor of proportionateness as between the yaw angle and the corresponding variation in the plate current of the tubes 45 and 46. This adjustment is readily obtained by slightly modifying the tube heating currents (whereby their thermo-ionic emission is modified) by means of a rheostat 67 (Figure 4) or through modifying the connection resistances 37 and 38 by means of mobile contacts 68 and 69.

The second method of adjustment is achieved by analogous actions applied either to the filaments of the tubes 64 and 65 or to the connection resistances 62 and 63 (Figure 5).

These two adjustments should be made once for all on the device being fitted up aboard the ship. As a matter of fact, the relation between the steering and the dynamic controls is dependent only on the characteristics of the ship concerned and remains constant for that particular ship.

The third method of adjustment is purposed to modify the intensity of the control applied to the rudder. For instance, in smooth water, said intensity would be increased in order to ensure quite rectilinear steering without any appreciable yaws; on the contrary, in a swell, said intensity would be lowered, for no good would result from starting the control against every sea that for the moment deflects the ship from her heading line. It is just in this manner that a helmsman acts, making more or less allowance according to circumstances.

This adjustment, too, may be effected in a number of ways.

For instance, I may adjust a variable resistance 70 in the return circuit of the excitation windings 47 and 48 of dynamo 49, or else I may change the excitation of the field 125 of motor 120 by means of a rheostat 126. The greater the introduced resistance 70, the more the intensity of the control will be reduced, and vice versa. So, resistance 70 must be accessible in view of adjusting the intensity of the automatic steering according to navigating conditions. The same remarks apply to the case where the speed of motor generator 120—49 is desired to be adjusted by means of rheostat 126.

Besides automatically controlling the rudder, the device provided under my invention readily lends itself to indicating either the yaw angle or the angular speed of said yaw. As an example, I will describe how the yaw angle came to be indicated:

Between the plates of the tubes 45 and 46, I intercalate in series a differential milliammeter containing two magnetizing coils 72 and 73 acting in opposition. When the ship, for a given heading line, shapes her course exactly therealong, the pointer 74 of the differential ammeter stands on zero, since the currents of the tubes 45 and 46 being equal, the actions of coils 72 and 73 neutralize one another. When a yaw angle occurs, pointer 74 is deflected either in the one or in the other direction, thereby denoting the yaw angle on a scale far larger than is possible with an ordinary compass, considering that, for instance, a small yaw angle may correspond to a great angle on dial 71.

The operation of the hereinbefore described automatic rudder control device is adapted to be interrupted at any moment with simultaneous release of the ordinary hand control, and vice versa. For this purpose, the description is made in reference to Figure 7 whereby are illustrated certain mechanical details adapted to establish connection between the rudder and the above described device. The corresponding electrical details are indicated on Figure 4.

Figure 6:
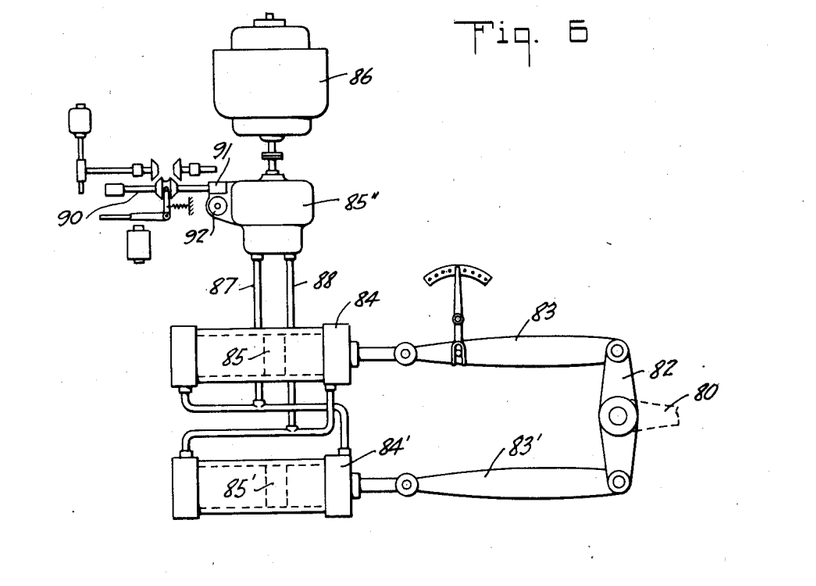
Figure 6 illustrates a device for passing from hand to automatic control, and vice versa.
Figure 7:
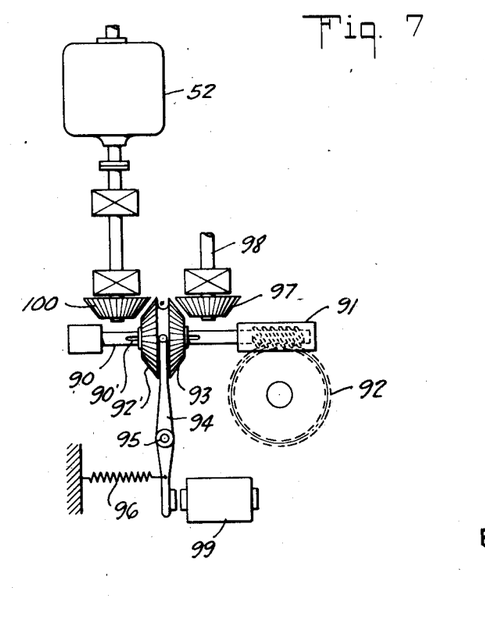
Figure 7 shows a detail of the control device illustrated by Figure 6.
Figure 9:
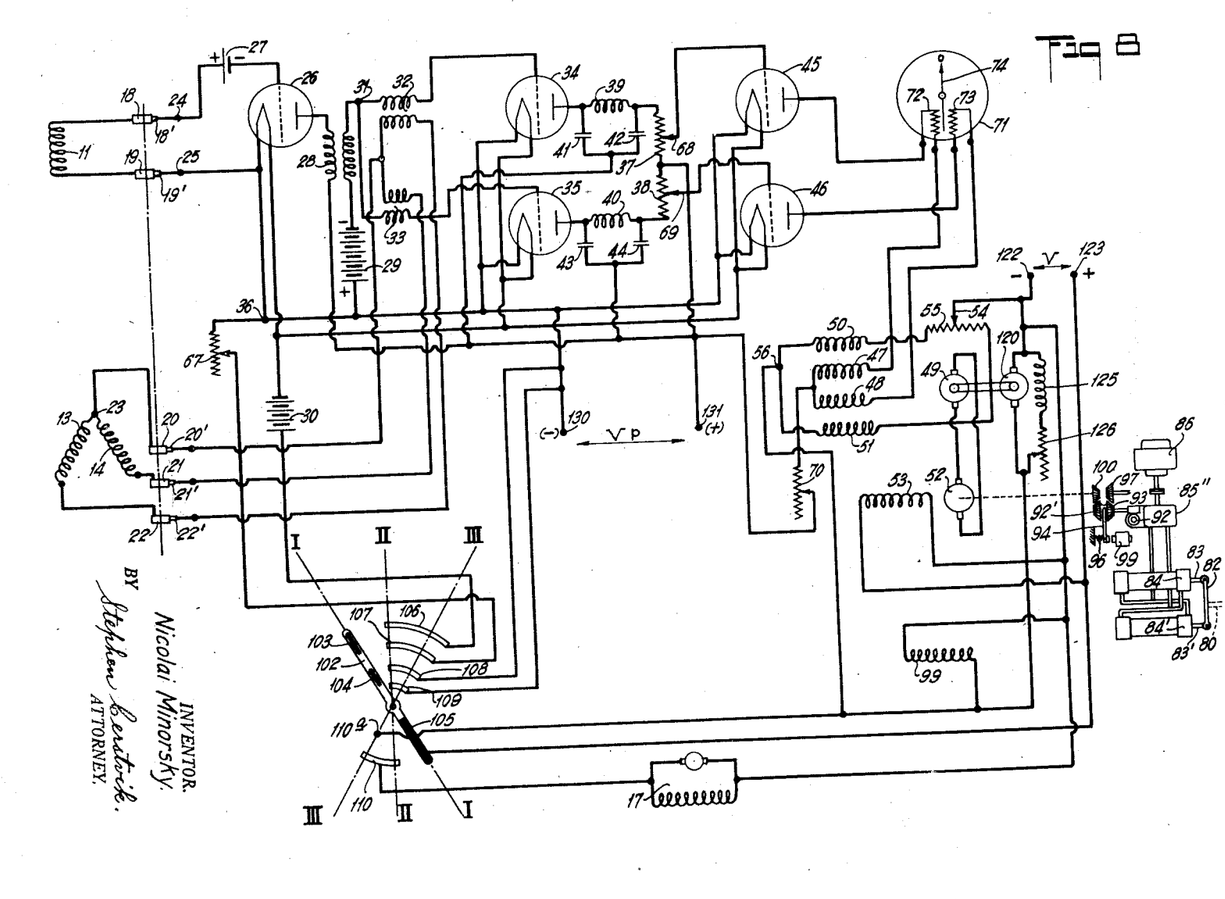

The automatic control device may be connected with any rudder operating system or gear. Since, however, all the actions exerted by the apparatus are continuous like the yawing motion itself, I find it preferable to use a continuously operating motor for moving the rudder. In Figure 6, I have illustrated a variable delivery hydraulic motor which, with suitable modifications, is being more and more employed on board ships. Since the device is well known to persons skilled in the art, I will only indicate the principal details thereof:

80 denotes the rudder; 82 is a swingle-tree the tie-rods of which are indicated at 83, 83'. In two hydraulic cylinders 84 and 84' are adapted to move pistons 85, 85' secured to tie-rods 83, 83'. The variable delivery hydraulic pump 85'' is driven by an electric motor 86. Through the pipes 87, 88, said pump communicates with cylinders 84, 84', as indicated on Figure 6. Variation of the pump delivery is produced by means of a shaft 90 (Fig. 7) provided with a worm 91 which actuates shaft 92 that regulates the delivery of pump 85'' both as to size and as to direction, and consequently governs the rudder's motions. On shaft 90 are connected for rotation therewith two bevel pinions 92', 93, coupled at their bases and enabled to slide along said shaft due to a key 90'. When the control is hand operated, a spring 96 acting on a lever 94 pivotable round a spindle 95, and having its end engaging the pinions 92', 93, brings into mesh pinions 93 and 97 secured on shaft 98 actuated by the helmsman. As indicated in Figure 7, an electro-magnet 99 can overcome the action of spring 96 and establishes a mechanical connection between the motor 52 of the automatic control and shaft 90 by causing the pinions 92' and 100 to mesh together.

The electrical parts and circuits that serve in passing from automatic to hand operation, and vice versa, are indicated on Figure 4. As an example, I will state that the control of said actions is effected by means of a switch having a circuit-breaker lever 102 adapted to occupy the three angular positions I—I, II—II, III—III. The mobile part of this switch is made of insulating material and carries three contacts 103, 104 and 105. The fixed part carries four segments 106, 107, 108, 109 located between positions II and III and also a fixed contact 110ª on line III and a fixed segment 110 between lines II and III. The segments 106 and 107, when spanned by the moving contact 103, are in series with the heating battery 30; segments 108 and 109, when spanned by the moving contact 104, are in series with the plate circuits fed by potential $V_p$ between terminals 130 (—) and 131 (+).

The segment 110 is connected with the small motor 17 (Figure 1) and, lastly, contact 110ª is connected through the electromagnet 99 with the motor 120 that drives the dynamo 49.

I have shown only an approximate diagram without indicating the starting rheostats. Bearing this in mind, it will be readily realized that the switch may be completed by supplementary contact pieces.

When switch lever 102 is in position I, control is by hand and the electric system (tubes, motors, etc.) remains inoperative.

If the switch lever 102 is in position II, contact 103 closes the heating circuits between segments 106, 107 and the tubes are lighted; contact 110ª closes the tube plate circuits; contacts 105 and 110 close the circuit to motor 17; the induction instrument is started. But the control remains by hand, since electromagnet 99 is not in circuit; the motor-generator 120—49 is also at rest. The plate currents of the tubes 45, 46 flow through windings 72 and 73 of the head indicator 71 which works in this case as a highly sensitive compass. So, in this case, while control is by hand, the helmsman is enabled to make use of the head indicator.

Lastly, if the switch lever 102 is in position III, the motor-generator 49—120 is started and electro-magnet 99 establishes connection between the automatic control and the rudder.

Obviously, passage from III to II and then to I will involve the same operations in reversed direction.

The foregoing scheme is open to modifications and improvements and is adduced merely as an example.

What is claimed as new and desired to be secured by Letters Patent is:

1. An automatic steering device for seacraft and air-craft comprising a device for producing a first electromotive force from the horizontal component of the terrestrial magnetic field, a magnet fixed to the craft, a device for producing two second electromotive forces from the field of said magnet, said second electromotive forces being equally and oppositely displaced in phase from the said first electromotive force, means to combine said electromotive forces whereby to produce a resultant electromotive force varying as a function of the yaw angle, and means operated by said resultant electromotive force to move the helm of the craft.

2. A device as in claim 1, in which said combining means is connected to cooperate with said devices to combine each of said second electromotive forces separately with said first electromotive force whereby to produce resultant electromotive forces varying oppositely to one another as functions of the yaw angle.

3. A device as in claim 1, in which said combining means is connected to cooperate with said devices to produce resultant electromotive forces varying oppositely to one another as functions of the yaw angle and the rate of change of the yaw angle.

4. A device as in claim 1, in which said helm moving means is operated according to the unbalanced differential effect of said resultant electromotive forces, and including means for progressively damping the initial unbalanced effect of the said two resultant electromotive forces.

5. In combination, a movable body, means for producing a first magnetic field having a predetermined direction with respect to said body, a pair of coils interposed in said first magnetic field to generate a pair of alternating electromotive forces which are displaced in phase relation to each other, a third coil interposed in the earth's magnetic field to generate a reference alternating electromotive force, means for combining said three electromotive forces whereby a variation results in the phase between the reference electromotive force and each of the other two electromotive forces upon a deviation of the movable body from a selected course established by the position of the first magnetic field, and steering mechanism for said movable body responsive to such variation in phase of the electromotive forces generated by said three coils.

6. In combination, a movable body, means for producing a first magnetic field having a predetermined direction with respect to said body, a pair of coils interposed in said first magnetic field to generate a pair of alternating electromotive forces which are displaced in phase relation to each other, a third coil interposed in the earth's magnetic field to generate a reference alternating electromotive force, means for combining said three electromotive forces whereby a variation results in the phase between the reference electromotive force and each of the other two electromotive forces upon a deviation of the movable body from a selected course established by the position of the first magnetic field, and steering mechanism for said movable body responsive to such variation in phase of the electromotive forces generated by said three coils, said combining means including a first device operated according to the yaw angle, a second device operated according to the instantaneous angular speed of yaw, means controlled by said first device to operate said steering mechanism, and means controlled by said second device to limit the speed of movement of said steering mechanism.

7. In combination, a movable body, means for generating an electromotive force from the horizontal component of the earth's magnetic field, a magnetic field having a predetermined direction with respect to said body, means for generating a pair of electromotive forces from said second field which are displaced in phase relation to each other, means for combining said electromotive forces and including a device operated according to the yaw angle and another device operated according to the instantaneous angular speed of yaw, means controlled by said first device to steer the movable body, and means controlled by said second device to limit the speed of movement of said steering means.

NICOLAI MINORSKY.